Aug. 21, 1962     I. K. DORTORT     3,050,634
CURRENT BALANCING IRON CONSTRUCTION
Filed Aug. 24, 1959     2 Sheets-Sheet 1
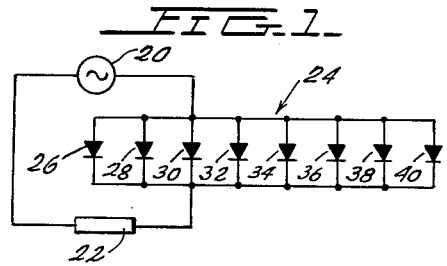
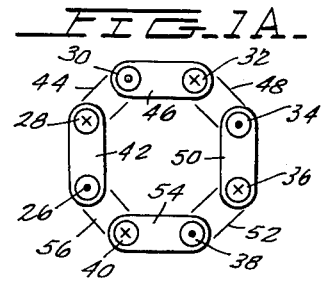
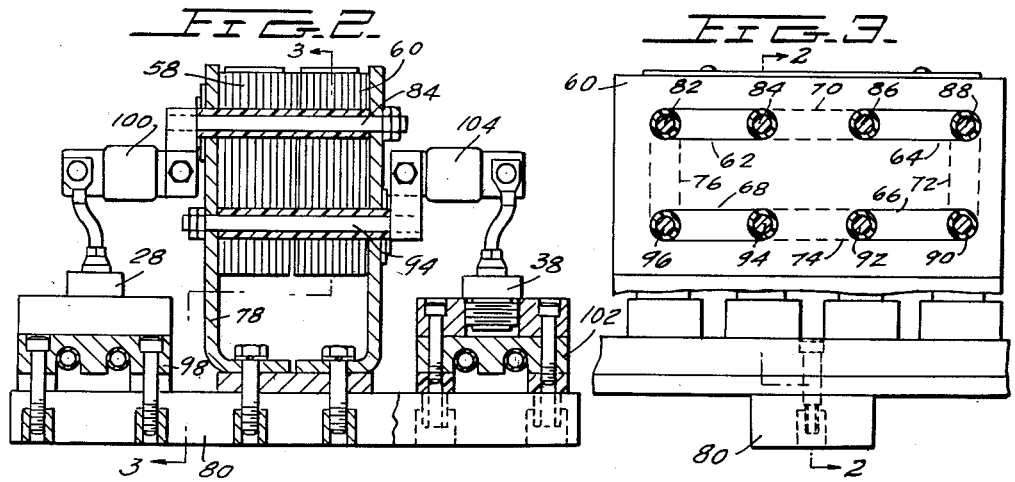
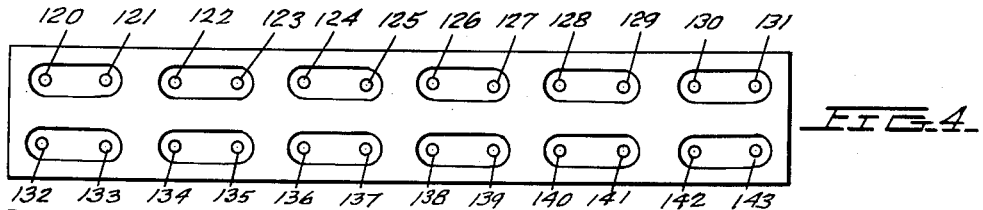
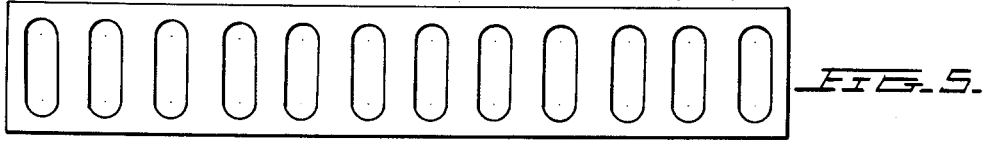
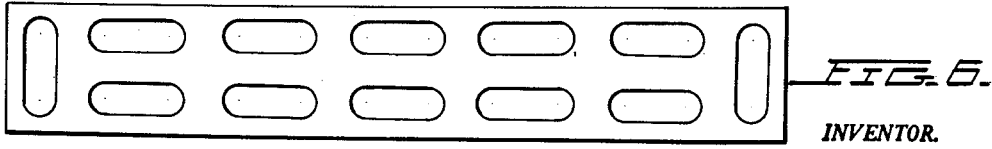
INVENTOR.
ISADORE K. DORTORT
BY
ATTORNEYS Aug. 21, 1962     I. K. DORTORT     3,050,634
CURRENT BALANCING IRON CONSTRUCTION
Filed Aug. 24, 1959     2 Sheets-Sheet 2

INVENTOR.
ISADORE K. DORTORT
BY
ATTORNEYS

United States Patent Office 3,050,634
Patented Aug. 21, 1962

3,050,634
CURRENT BALANCING IRON CONSTRUCTION
Isadore K. Dortort, Philadelphia, Pa., assignor to I-T-E Circuit Breaker Company, Philadelphia, Pa., a corporation of Pennsylvania
Filed Aug. 24, 1959, Ser. No. 835,743
9 Claims. (Cl. 307—58)

This invention relates to a novel configuration for current balancing reactors formed of laminations for balancing the current between a plurality of parallel connected diodes, and is more specifically an improvement of the current balancing laminations disclosed in copending application Serial No. 732,868, now Patent No. 2,945,961, filed May 5, 1958, in the name of George A. Healis, entitled "Current Balancing Reactors for Diodes," and assigned to the assignee of the present invention.

In the above noted copending application, the conductors extending from a plurality of diodes which are to be connected in parallel are encircled by a magnetic material to form a coupling reactor which magnetically couples the two adjacent diode conductors. When a plurality of diode conductors are used, a corresponding plurality of coupling reactors are provided from a stack of sheets of magnetic material having stamped openings for appropriately reeciving pairs of adjacent diode conductors. The maximum current unbalance in such a scheme between any two diodes will be the magnetizing currents of the interposed reactors between these two diodes added together. Accordingly, it is possible that this total value, when a large number of diodes are connected in parallel, and, thus, a large number of intervening reactors exist, may be greater than desired.

In the present invention, I form the stacks of lamination sheets in such a way that even when a large number of diodes and reactors are used, each closed chain of diodes will only include a minimum number of reactors. That is to say, I form the complete balancing system of a plurality of meshes of closed chain systems. Preferably, each mesh will include four reactors or links or loops which is only one larger than the absolute minimum of three links for a closed chain system. This additional reactor element, however, has been found to increase the current unbalancing only by a very small value, so that the four-loop chain is as satisfactory as the minimum size three-loop chain, and in addition, utilizes only straight conductors.

Accordingly, a primary object of my invention is to provide a novel current balancing magnetic structure for parallel connected diodes.

Another object of my invention is to reduce the maximum current unbalance between parallel connected diodes which are balanced by coupling reactor means.

A further object of my invention is to provide a balancing reactor structure for parallel connected diodes which uses a plurality of closed chains.

These and other objects of my invention will become apparent from the following description when taken in conjunction with the drawings, in which:

FIGURE 1 shows a circuit diagram of a rectifier system including a plurality of parallel connected diodes.

FIGURE 1A schematically illustrates the manner in which the parallel connected diodes of FIGURE 1 may be connected in a closed chain arrangement by coupling reactors.

FIGURE 2 shows a cross-sectional view of one leg of a physical embodiment of a rectifier circuit, and shows how the coupling reactors are formed of a stack of lamination sheets which are supported from the rectifier bus bars.

FIGURE 3 is a view of FIGURE 2 taken across the lines 3—3.

FIGURE 4 illustrates the laminations of a first stack portion to be used in accordance with the present invention.

FIGURE 5 shows the intermediate laminations to be used with the laminations of FIGURE 4 in accordance with the present invention.

FIGURE 6 illustrates the last lamination stack to be combined with the laminations of FIGURES 4 and 5 in accordance with the present invention.

Figure 7:
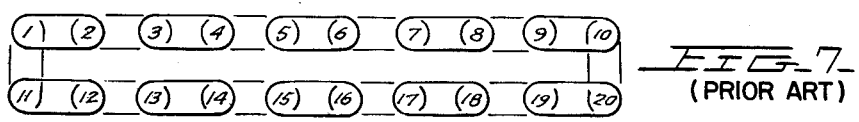
FIGURE 7 illustrates the problem faced by the prior art when a large number of diodes are connected in a closed chain arrangement.

Referring now to FIGURE 1, I have schematically illustrated a single phase half-wave rectifier having an A.-C. source 20 which delivers D.-C. power to a D.-C. load 22 through the parallel connected system of rectifiers 24 which includes parallel connected diodes 26, 28, 30, 32, 34, 36, 38 and 40.

As is described in the above noted copending application Serial No. 732,868, because of the difference in the forward conducting characteristics of diodes 26 through 40, there can be a substantial difference between the currents conducted by these elements. Accordingly, a coupling reactor means, as illustrated in FIGURE 1A, is used to couple the conductors of diodes 26 through 40. Thus, a coupling reactor 42 couples the conductors associated with diodes 26 and 28. In a like manner, reactor 44 couples diodes 28 and 30 while reactor cores 46, 48, 50, 52, 54 and 56 couple the remaining adjacent pair of diode conductors as shown.

It is to be noted that in this arrangement, the diodes are arranged to carry current as illustrated by the conventional use of the dot and cross where the dot indicates current flow out of the plane of the drawing, while the cross illustrates current flow into the plane of the drawing.

While the coupling reactors could be simple reactor cores, as shown in FIGURE 1A, it is more economical to form these reactors of a stack of stamped lamination sheets. This type of construction is shown in FIGURES 2 and 3 where lamination stacks 58 and 60 have stamped openings therein for receiving various conductors associated with the parallel connected diodes. Thus, the lamination stack 60 has stamped openings 62, 64, 66 and 68 therein, while lamination stack 58 has stamped openings 70, 72, 74 and 76 therein. The lamination stack including portions 58 and 60 is then supported from the saddle-shaped D.-C. bus 78 which, in turn, is connected to a frame support means 80.

More specifically, the diodes 26 through 40 of FIGURES 1 and 1A are illustrated as having conductors 82, 84, 86, 88, 90, 92, 94 and 96 associated therewith in FIGURES 2 and 3. In FIGURE 2, the diode conductor 84 of diode 28 on D.-C. bus 98 extends from fuse 100 through the two stacks of laminations 58 and 60 to terminate on the right-hand side of saddle-shaped bus bar 78. In the same manner, diode conductor 94, associated with diode 38 on bus bar 102 (which is connected to bus bar 98) extends from fuse 104 through the lamination stack 58—60 to terminate on the left-hand side of saddle-shaped bus 78.

Accordingly, the various diode conductors 82 through 96 (which are surrounded by insulating sleeves as shown) serve to support lamination stacks 58 and 60 from the bus 78.

For further details of the specific manner in which this construction is completed, reference is made to the above noted copending application Serial No. 732,868.

As previously described, in a relatively long chain such as that of FIGURES 1A and 3, the maximum unbalance between diodes, such as the diodes associated with conductors 84 and 92, is the magnetizing current of the magnetic circuits joining these diodes. This is not too severe in the case of eight parallel connected diodes, but when a larger number of diodes is used for large current ratings, the relatively large number of intervening loops between two diodes and the resultant addition of the magnetizing current of each of the intervening loops to determine maximum unbalance between these elements, may be relatively severe. By way of example, in FIGURE 7, I have illustrated twenty parallel connected diodes having numbered positions 1 through 20 which are connected by coupling reactors in the manner of the coupling reactors of FIGURES 1A. In such a case, the maximum amount of current unbalance between the diodes at locations 5 and 15 will be the magnetizing current of the nine intervening loops.

The principle of the present invention is to form the current balancing reactor structure in a mesh of loops, each having a relatively small number of connections.

Figure 8:
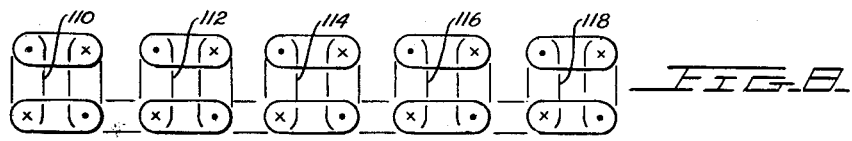
FIGURE 8 illustrates the manner in which this problem is solved using multiple meshes coupled together by single links.

For example, the structure of FIGURE 7, which was formed by two layers of laminations (or by appropriately positioned C types cores) can be modified by an additional third layer providing additional loops for connecting the diodes above and below one another as shown in FIGURE 8. This will then form five individual meshes 110, 112, 114, 116 and 118, each of which includes four coupled reactors. Note that in FIGURE 8, one of the two layers of FIGURE 7 has been modified as shown in FIGURE 6 so that the reactors between locations 2–3, 4–5, 6–7 and 8–9 have been eliminated.

Figure 9:
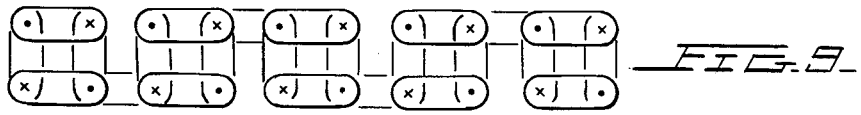
FIGURE 9 illustrates another solution of the problem using multiple meshes tied together by single links at the diagonals.

A similar structure can be achieved, as illustrated in FIGURE 9, by eliminating alternately upper and lower reactor connections between diode locations 2–3, 14–15, 6–7 and 18–19.

Figure 7A:
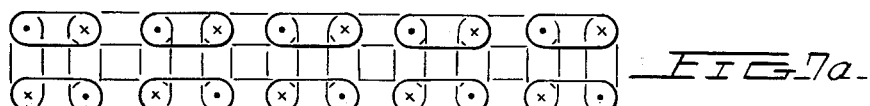
FIGURE 7A illustrates a preferred solution, using the lamination of FIGURES 4, 5 and 6.

In a preferred embodiment of my invention showing FIGURE 7A, the complete laminated structure is formed of three types of laminations (or appropriate magnetic cores) which include lamination sheets having stamped openings, as shown in FIGURES 4, 5 and 6 respectively for coupling diode conductors 120 through 143 respectively of FIGURE 4. When the lamination sheet of FIGURE 4 is combined with the lamination sheet of FIGURE 6, the typical closed chain construction, similar to that of FIGURE 7, is achieved. In accordance with the present invention, however, the lamination sheet of FIGURE 5 is also used to connect the diode conductors, such as conductors 121 and 133, and 122 and 134 and so on.

The novel lamination structure finally achieved will be one which includes eleven individual loops of four diodes for a system including twenty-four parallel connected diodes. Thus, diodes 120, 121, 132 and 133 will be connected in a four-chain loop. In a like manner, diodes, such as diodes 121, 122, 133 and 134 will be connected in a second four-chain loop. Accordingly, the maximum unbalance of any of the diodes in any group of four will not be greater than the maximum unbalance of a four-chain loop, and since adjacent meshes have one loop in common the accuracy of matching diode currents throughout the diode system is found to be substantially improved.

That is, the use of transverse slots, such as the transverse slots of FIGURE 5, in the reactor stack provides a considerable improvement in the current balancing between a large number of parallel connected diode elements. It is to be noted that in the total amount of iron for the reactor is not increased, but the same total iron cross-sectional area is used as in the case of prior reactors.

While I have described a preferred embodiment of the invention as using flat stamped laminations, it will be clear that the laminations could be of any desired type and formed in the shape of C cores or the like. Similarly, the reactor could use a sintered material as the laminations.

Figure 10:
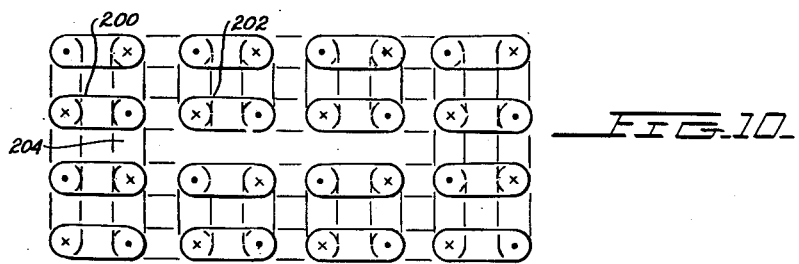
FIGURE 10 shows another embodiment of the invention, using a closed chain of double-linked meshes.
Figure 11:
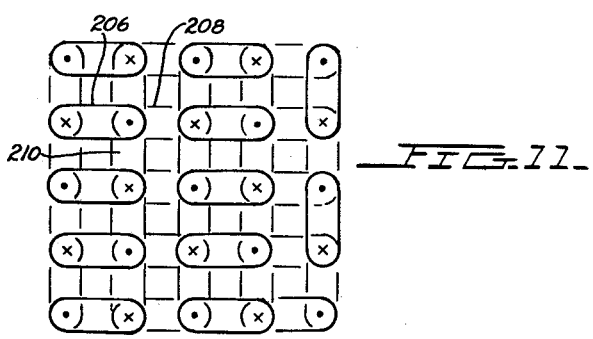
FIGURE 11 illustrates a further embodiment of the invention using a matrix arrangement which requires four layers of lamination sheets.

FIGURES 10 and 11 illustrate the manner in which double linked meshes can be achieved through the appropriate use of four layers of laminations. Thus, in FIGURE 10, mesh 200 will be linked to the adjacent meshes 202 and 204 where each of the meshes includes four diode conductors.

In a like manner, the alternative arrangement of FIGURE 11 shows how a mesh such as mesh 206 is linked to adjacent meshes 208 and 210.

In the foregoing, the invention has been described solely in connection with specific illustrative embodiments thereof. Since many variations and modifications of the invention will now be obvious to those skilled in the art, I prefer to be bound not by the specific disclosures herein contained, but only by the appended claims.

I claim:

1. A current balancing reactor for a plurality of parallel connected diodes; each of said diodes having a diode conductor extending therefrom; said diode conductors forming reactor windings for said current balancing reactor; said current balancing reactor having a core formed of a plurality of laminations; at least a first portion of said plurality laminations having openings therein for receiving first pairs of said diode conductors and defining a magnetic circuit for connecting said first pairs of diode conductors in a chain arrangement; at least a second portion of said laminations having openings therein receiving second pairs of said diode conductors defining a magnetic circuit for connecting said second pairs of diode conductors in a chain arrangement.

2. A current balancing reactor for a plurality of parallel connected diodes; each of said diodes having a diode conductor extending therefrom; said diode conductors forming reactor windings for said current balancing reactor; said current balancing reactor having a core formed of a plurality of laminations; at least a first portion of said plurality laminations having openings therein for receiving first pairs of said diode conductors and defining a magnetic circuit for connecting said diode conductors in a first chain arrangement; at least a second portion of said laminations having openings therein for receiving second pairs of said diode conductors defining a magnetic circuit for connecting said second pairs of diode conductors in a second chain arrangement; each of said first and second chains of diodes including four diodes of said plurality of diodes; said plurality of diodes comprising at least six diodes.

3. A current balancing reactor for a plurality of parallel connected dioeds; each of said diodes having a diode conductor extending therefrom; said diode conductors forming reactor windings for said current balancing reactor; said current balancing reactor having a core formed of a plurality of laminations; at least a first portion of said plurality laminations having openings therein for receiving first pairs of said diode conductors and defining a magnetic circuit for connecting said diode conductors in a first chain arrangement; at least a second portion of said laminations having openings therein for receiving second pairs of said diode conductors defining a magnetic circuit for connecting said second pairs of diode conductors in a chain arrangement; said diode conductors extending straight through said openings to form said reactor windings.

4. A current balancing reactor for a plurality of parallel connected diodes; each of said diodes having a diode conductor extending therefrom; said diode conductors forming reactor windings for said current balancing reactor; said current balancing reactor having a core formed of a plurality of first second and third laminations; each of said first second and third laminations having openings therein for receiving pairs of said diode conductors; said openings of said first laminations and said openings of said second laminations being aligned to receive respective first pairs of said diode conductors and to couple said first pairs of diode conductors in a closed chain; said third lamination openings being aligned with respect to said openings of said first and second laminations to couple second pairs of diode conductors and to form a plurality of individual chains of diodes.

5. A current balancing reactor for a plurality of parallel connected diodes; each of said diodes having a diode conductor extending therefrom; said diode conductors forming reactor windings for said current balancing reactor; said current balancing reactor having a core formed of a plurality of first second and third laminations; each of said first second and third laminations having openings therein for receiving pairs of said diode conductors; said openings of said first laminations and said openings of said second laminations being aligned to receive respective first pairs of said diode conductors and to couple said first pairs of diode conductors in a closed chain; said third lamination openings being aligned with respect to said openings of said first and second laminations to couple second pairs of diode conductors and to form a plurality of individual chains of diodes; each of said individual chains of diodes including four diodes of said plurality of diodes; said plurality of diodes comprising at least six diodes.

6. A current balancing reactor for a plurality of parallel connected diodes; each of said diodes having a diode conductor extending therefrom; said diode conductors forming reactor windings for said current balancing reactor; said current balancing reactor having a core formed of a plurality of first second and third laminations; each of said first second and third laminations having openings therein for receiving pairs of said diode conductors; said openings of said first laminations and said openings of said second laminations being aligned to receive respective first pairs of said diode conductors and to couple said first pairs of diode conductors in a closed chain; said third lamination openings being aligned with respect to said openings of said first and second laminations to couple second pairs of diode conductors and to form a plurality of individual chains of diodes; each of said individual chains of diodes including four diodes of said plurality of diodes; said plurality of diodes comprising at least six diodes; said diode conductors extending straight through said openings to form said reactor windings.

7. A current balancing reactor for balancing the current between a plurality of circuit conductors; said circuit conductors forming individual reactor windings for said current balancing reactor; the core for said reactor being comprised of a first, second and third plurality of magnetic laminations arranged in stacked relation; said first plurality of laminations having a first and second parallel row of spaced and longitudinally elongated slots; said second plurality of laminations having a first and second parallel row of spaced and longitudinally elongated slots longitudinally displaced from and partially overlapping said respective slots of said first plurality of laminations; said second plurality of laminations further including a transversely elongated slot at either end positioned to partially overlap the said slots of said first plurality of laminations at either end of said first plurality of laminations said third plurality of laminations including a plurality of spaced transversely elongated slots positioned to partially overlap respective slots of said first plurality of laminations; each of said slots receiving a pair of said conductors; each of said overlapping portion of said slots of said first, second and third pluralities of laminations defining and opening for a respective conductor of said plurality of conductors.

8. A current balancing reactor for balancing the current between a plurality of circuit conductors; said circuit conductors forming individual reactor windings for said current balancing reactor; the core for said reactor being comprised of a first, second and third plurality of magnetic laminations arranged in stacked relation; said first plurality of laminations having a first and second parallel row of spaced and longitudinally elongated slots; said second plurality of laminations having a first and second parallel row of spaced and longitudinally elongated slots longitudinally displaced from and partially overlapping said respective slots of said first plurality of laminations; said second plurality of laminations further including a transversely elongated slot at either end positioned to partially overlap the said slots of said first plurality of laminations at either end of said first plurality of laminations said third plurality of laminations including a plurality of spaced transversely elongated slots positioned to partially overlap respective slots of said first plurality of laminations; each of said slots receiving a pair of said conductors; each of said overlapping portion of said slots of said first, second and third pluralities of laminations defining and opening for a respective conductor of said plurality of conductors; each of said conductors being connected in series with a diode.

9. A current balancing reactor for a plurality of parallel connected diodes; each of said diodes having a diode conductor extending therefrom; said diode conductors forming reactor winding means for said current balancing reactor; said current balancing reactor having a magnetic core means; at least a first portion of said magnetic core means being adapted to receive first pairs of said diode conductors to magnetically couple said diode conductors in a chain arrangement; a second portion of said magnetic core means being adapted to receive second pairs of said diode conductors to magnetically couple said diode conductors to provide a plurality of individual chains of diodes.

References Cited in the file of this patent

UNITED STATES PATENTS 2,945,961    Healis _____ July 19, 1960

OTHER REFERENCES

"Balancing Reactors for Semiconductor Rectifiers," by I. K. Dortort, published in Electrical Engineering; vol. 77, No. 7 (July 1958), page 589 relied on.